(12) United States Patent
Al-Hawaj

(10) Patent No.: US 10,088,019 B2
(45) Date of Patent: Oct. 2, 2018

(54) BELT DRIVE ASSEMBLY

(71) Applicant: KUWAIT UNIVERSITY, Safat (KW)

(72) Inventor: Osamah Al-Hawaj, Kuwait (KW)

(73) Assignee: KUWAIT UNIVERSITY, Safat (KW)

( * ) Notice: Subject to any disclaimer, the term of this patent is extended or adjusted under 35 U.S.C. 154(b) by 127 days.

(21) Appl. No.: 15/278,466

(22) Filed: Sep. 28, 2016

(65) Prior Publication Data

US 2018/0087627 A1    Mar. 29, 2018

(51) Int. Cl.
| F16H 7/00 | (2006.01) |
| F16H 7/02 | (2006.01) |
| F16H 7/08 | (2006.01) |
| F16H 7/12 | (2006.01) |

(52) U.S. Cl.
CPC ............... *F16H 7/02* (2013.01); *F16H 7/08* (2013.01); *F16H 7/1263* (2013.01); *F16H 2007/0806* (2013.01); *F16H 2007/0865* (2013.01); *F16H 2007/0874* (2013.01); *F16H 2007/0891* (2013.01)

(58) Field of Classification Search
CPC .... B25J 9/104; F16G 1/28; F16H 7/02; Y10T 74/20323; A61B 34/30
USPC .................................................. 474/148, 150
See application file for complete search history.

(56) References Cited

U.S. PATENT DOCUMENTS

| 423,046 | A | * | 3/1890 | Gregg | F16H 7/02 |
| | | | | | 474/62 |
| 494,741 | A | * | 4/1893 | Forrester | F16H 7/023 |
| | | | | | 474/148 |
| 2,522,148 | A | * | 9/1950 | Traxler | D01H 3/00 |
| | | | | | 474/62 |
| 2,844,133 | A | * | 7/1958 | Thompson | F02B 33/00 |
| | | | | | 123/184.32 |
| 2,924,982 | A | | 2/1960 | Harrer | |
| 3,144,789 | A | | 8/1964 | Ladin | |
| 3,517,565 | A | * | 6/1970 | Smith | F16G 1/28 |
| | | | | | 474/203 |
| 3,576,138 | A | | 4/1971 | Wildhagen | |
| 3,626,771 | A | * | 12/1971 | Luedtke | A01D 69/06 |
| | | | | | 474/58 |
| 3,748,917 | A | * | 7/1973 | Berg | F16G 1/22 |
| | | | | | 474/153 |
| 3,919,893 | A | * | 11/1975 | Boehm | A01D 34/6806 |
| | | | | | 474/134 |
| 4,214,488 | A | * | 7/1980 | Conrad | B29D 29/00 |
| | | | | | 474/148 |

(Continued)

*Primary Examiner* — Henry Y Liu
(74) *Attorney, Agent, or Firm* — Richard C. Litman

(57) ABSTRACT

The belt drive assembly includes a frame having a first plate including an inner surface, an outer surface, a first end, and a second end, a second plate including an inner surface, an outer surface, a first end, and a second end, and a shaft disposed between the first plate and the second plate. The belt drive assembly also includes a first pair of idler pulley wheels positioned coaxially at one end of the first plate, a second pair of idler pulley wheels positioned coaxially at one end of the second plate, a drive pulley wheel rotatably mounted onto the outer surface of the first plate, a driven pulley wheel rotatably mounted onto the outer surface of the second plate, and an endless belt trained on the drive pulley wheel, on each idler pulley wheel, and on the driven pulley wheel.

20 Claims, 13 Drawing Sheets

(56) References Cited

U.S. PATENT DOCUMENTS

| | | | | |
|---|---|---|---|---|
| 4,315,751 A * | 2/1982 | Conrad | F16G 1/28 | 474/154 |
| 4,424,619 A * | 1/1984 | Conrad | F16G 1/28 | 29/527.4 |
| 4,452,193 A * | 6/1984 | Morris | F02B 67/06 | 123/195 A |
| 5,413,537 A * | 5/1995 | Hume | F16H 7/06 | 474/154 |
| 5,445,572 A * | 8/1995 | Parker | A61G 5/04 | 475/182 |
| 5,697,256 A * | 12/1997 | Matteo | B25J 9/104 | 475/210 |
| 6,626,630 B1 * | 9/2003 | Lomerson, Jr. | B25J 9/023 | 414/749.1 |
| 6,651,413 B2 * | 11/2003 | Papke | A01D 34/76 | 474/85 |
| 7,056,245 B2 * | 6/2006 | Koase | B41J 11/007 | 474/133 |
| 7,398,707 B2 * | 7/2008 | Morley | A61B 17/062 | 74/490.06 |
| 7,427,247 B2 * | 9/2008 | Melone | A01D 69/00 | 474/62 |
| 7,628,093 B2 * | 12/2009 | Madhani | B25J 9/104 | 74/490.03 |
| 8,220,354 B2 * | 7/2012 | Todorov | B25J 9/042 | 414/744.3 |
| 8,491,603 B2 * | 7/2013 | Yeung | B25J 9/047 | 606/130 |
| 8,924,009 B2 * | 12/2014 | Salisbury | B25J 3/04 | 606/130 |
| 9,447,849 B1 * | 9/2016 | Edsinger | B25J 9/1045 | |

* cited by examiner

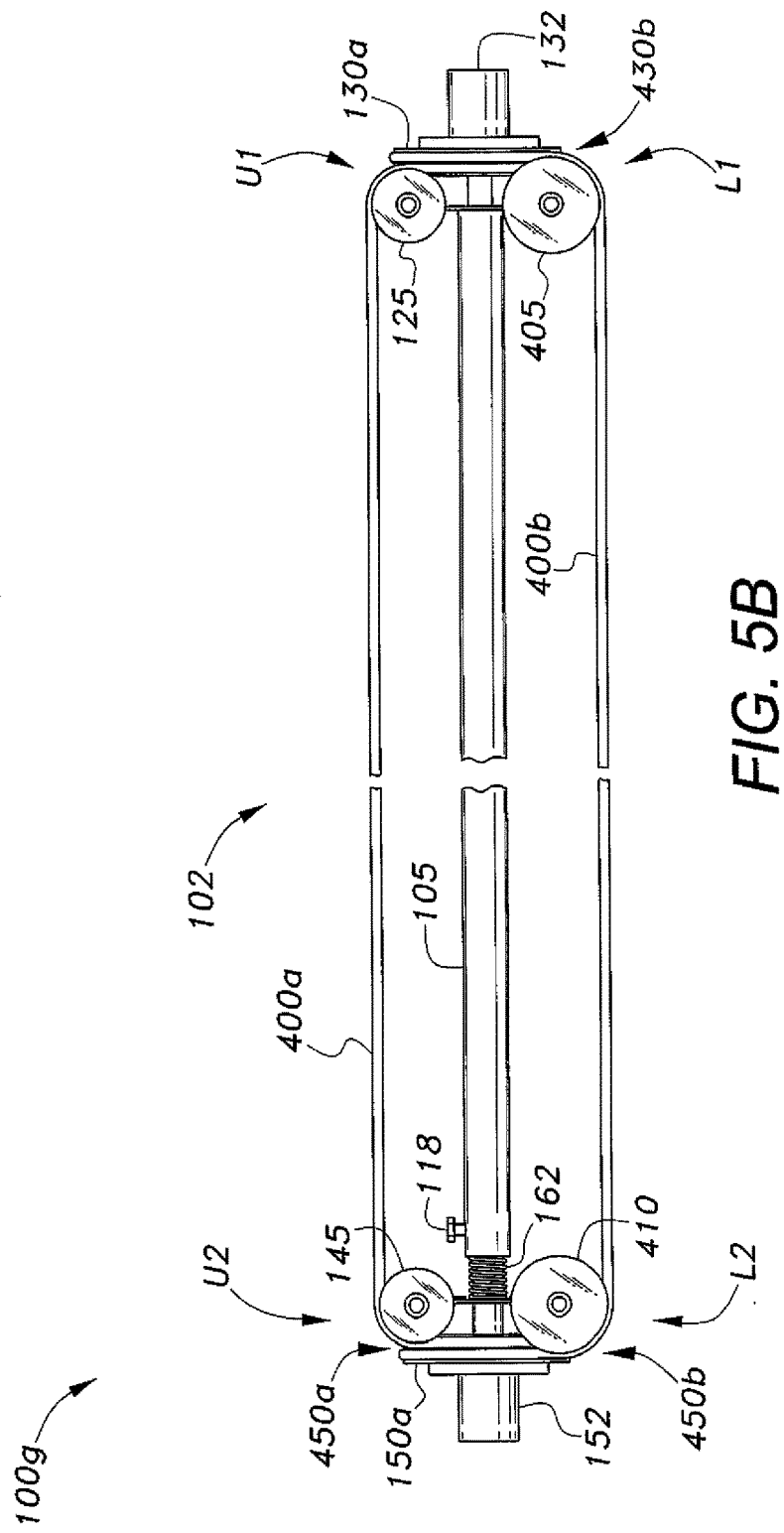

BELT DRIVE ASSEMBLY

BACKGROUND OF THE INVENTION

1. Field of the Invention

The present invention relates to power transmission systems, and particularly to a belt drive assembly for transmitting power from a power source through a drive shaft to an axially spaced driven shaft coupled to a driven component.

2. Description of the Related Art

Currently, drive shafts, such as propeller shafts and cardan shafts, are used to transfer torque and rotation between a power source and a driven component. Despite being one of the most efficient methods of power transmission, drive shafts typically undergo bending vibration and require the use of stiffly designed shafts and central bearings to minimize the amplitude of bending vibration of the drive shaft. Further, drive shafts can also experience vibration from the misalignment between the power source and the driven component from phasing, as with a two joint drive, and from drive shaft deflection and imbalance. Such vibration can lead to unnecessary wear and tear, and in some instances, failure of the drive shaft, which can, in turn, lead to serious injury, and in some cases, death.

Thus, a belt drive assembly solving the aforementioned problems is desired.

SUMMARY OF THE INVENTION

The belt drive assembly includes a frame including a first plate having an inner surface, an outer surface, a first end, and a second end; a second plate having an inner surface, an outer surface, a first end, and a second end; and a shaft disposed between the inner surface of the first plate and the inner surface of the second plate. The belt drive assembly also includes a first pair of coaxial idler pulley wheels rotatably mounted at one end of the first plate; a second pair of coaxial idler pulley wheels rotatably mounted at one end of the second plate; a drive pulley wheel rotatably mounted on the outer surface of the first plate, the drive pulley wheel being rotated by a power source; a driven pulley wheel rotatably mounted on the outer surface of the second plate, the driven pulley wheel rotating a driven component; and an endless belt trained on the drive pulley wheel, over each idler pulley wheel, and on the driven pulley wheel, so that the endless belt transfers torque and rotation from the power source to the driven component.

These and other features of the present invention will become readily apparent upon further review of the following specification and drawings.

BRIEF DESCRIPTION OF THE DRAWINGS

FIG. 5B is a side view of the belt drive assembly of FIG. 5A.

Similar reference characters denote corresponding features consistently throughout the attached drawings.

DETAILED DESCRIPTION OF THE PREFERRED EMBODIMENTS

Figure 1A:
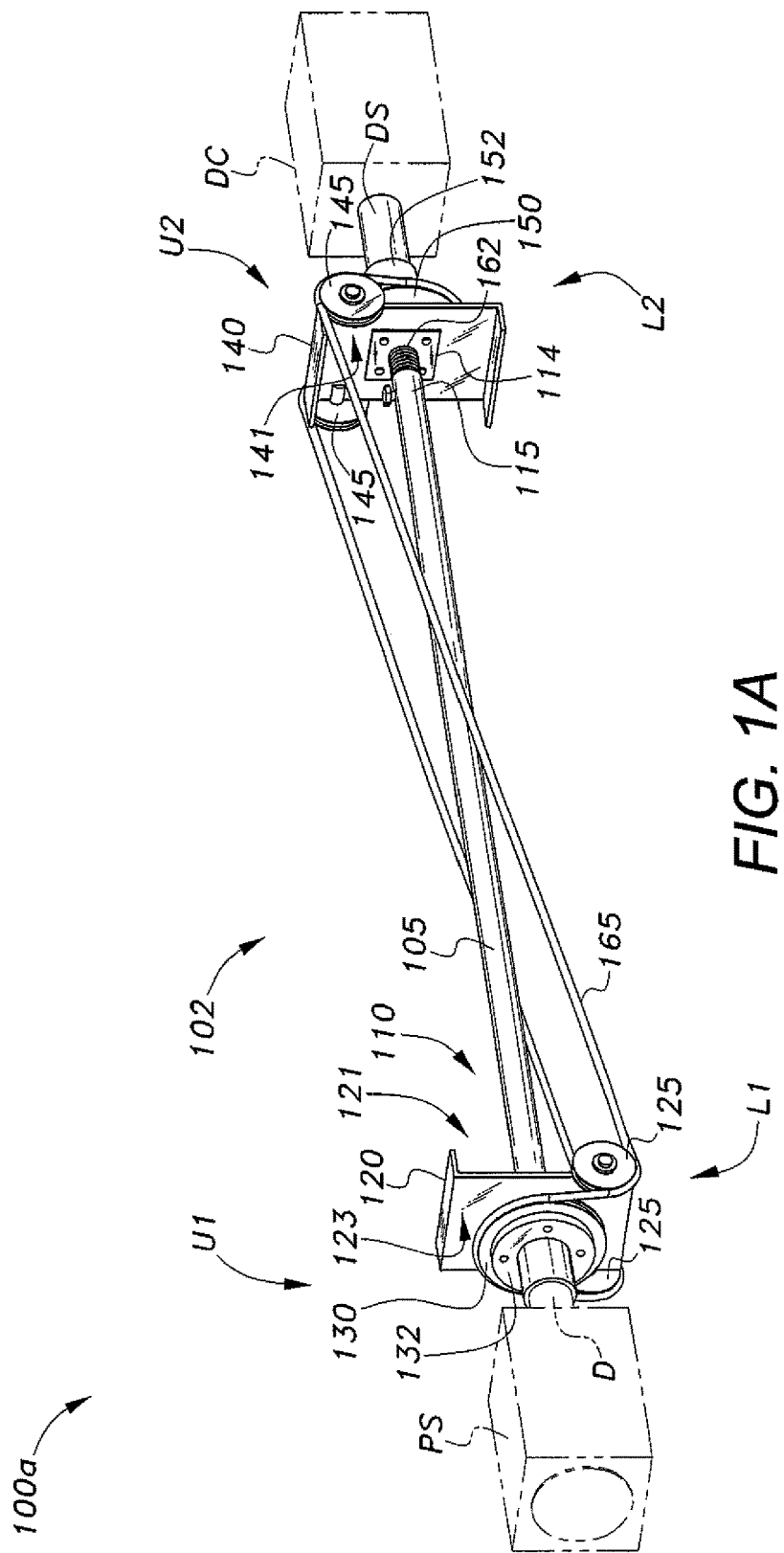
FIG. 1A is a perspective view of a first embodiment of a belt drive assembly according to the present invention.
Figure 1B:
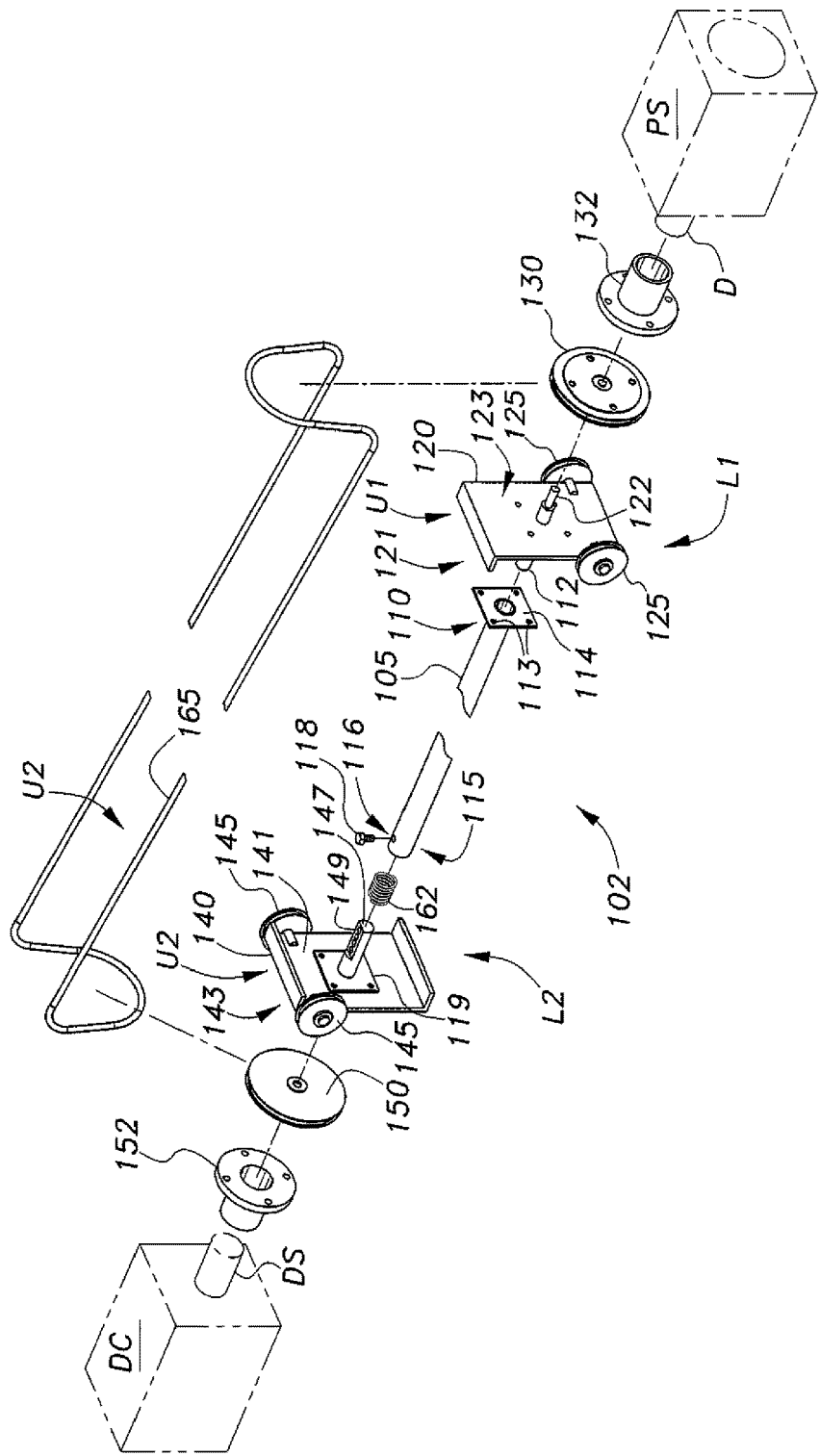
FIG. 1B is an exploded perspective view of the belt drive assembly of FIG. 1A.
Figure 1C:
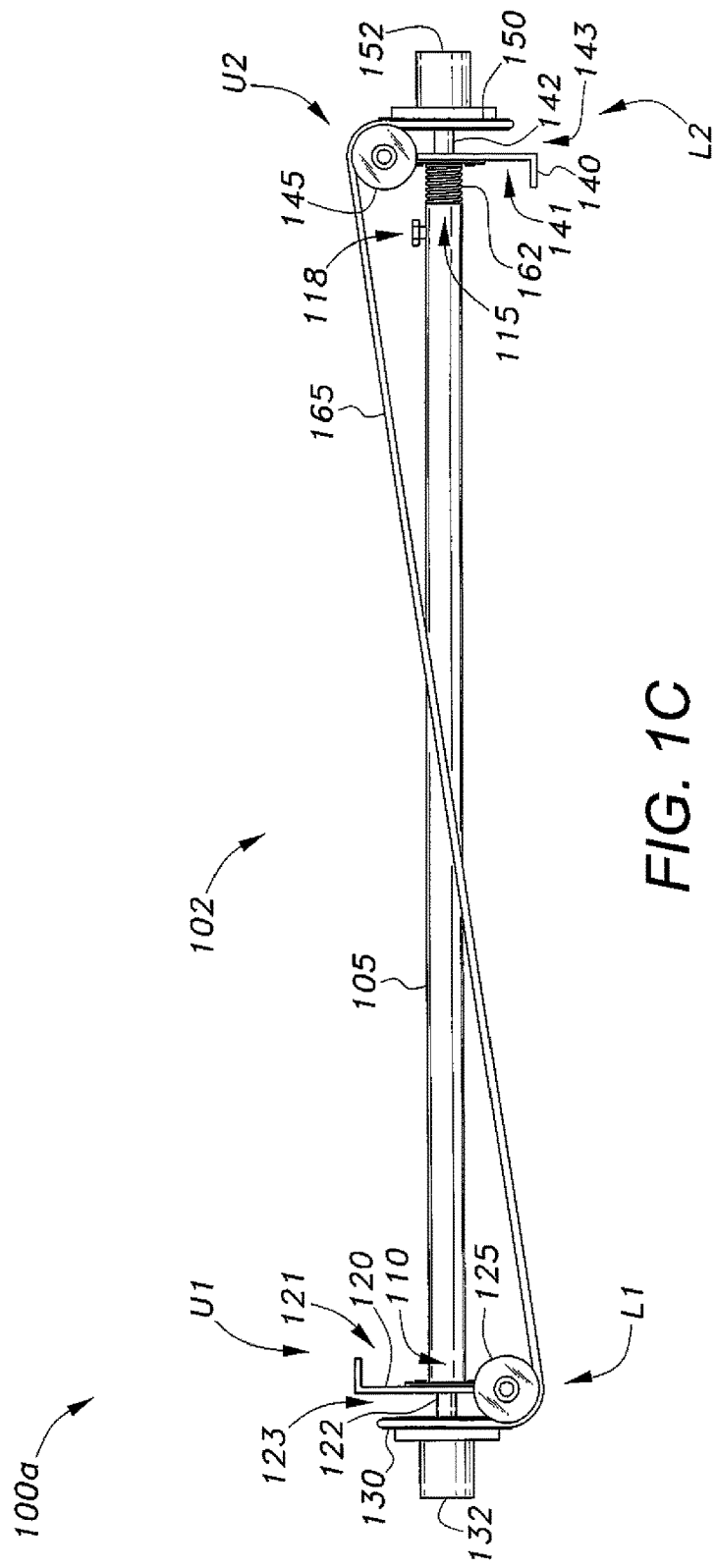
FIG. 1C is a side view of the belt drive assembly of FIG. 1A.

Referring to FIGS. 1A-1C, a first embodiment of the belt assembly, generally designated 100a, is illustrated. The belt drive assembly 100a includes a frame 102 that has a first plate 120 having an inner surface 121, an outer surface 123, a first end U1, and a second end L1. The inner surface 121 of the first plate 120 has an attachment member 112, and the outer surface 123 of the first plate 120 also has an attachment member 122. The frame 102 also includes a second plate 140 having an inner surface 141, an outer surface 143, a first end U2, and a second end L2. The inner surface 141 of the second plate 140 has an attachment member 147 including a plurality of openings 149, and the outer surface 143 of the second plate 140 also has an attachment member 142. An intermediate frame portion, namely shaft 105, extends between the inner surface 121 of the first plate 120 and the inner surface 141 of the second plate 140, the first plate 120 and the second plate 140 being parallel and axially spaced apart from each other. It is to be noted that the intermediate frame portion can include multiple shafts.

The belt drive assembly 100a further includes a drive pulley wheel 130 rotatably mounted on the outer surface 123 of the first plate 120. The drive pulley wheel 130 is rotated by a power source PS, such as a drive shaft D. A driven pulley wheel 150 is rotatably mounted on the outer surface 143 of the second plate 140. The driven pulley wheel 150 rotates a driven component DC, such as a driven shaft DS. A first pair of coaxial idler pulley wheels 125 is rotatably mounted at the second end L1 of the first plate 120, and a second pair of coaxial idler pulley wheels 145 is rotatably mounted at the first end U2 of the second plate 140. An endless belt 165 is trained on the drive pulley wheel 130, each idler pulley wheel 125, 145, and on the driven pulley wheel 150, wherein the endless belt 165 transfers torque and rotation from the power source PS to the driven component DC. The idler pulleys 125 of the belt assembly 100a are rotatably mounted on the second end L1 of the first plate, and the idler pulleys 145 are rotatably mounted at the first end U2 so that the belt 165 slopes upward between the first plate 120 and the second plate 140. Also, the belt 165 is configured in an inverted "U" over the drive pulley 130 and in an upright "U" under the driven pulley 150. Thus, as viewed from the side, the belt 165 describes an inverted "N" configuration, as shown in FIG. 1C.

Figure 1D:
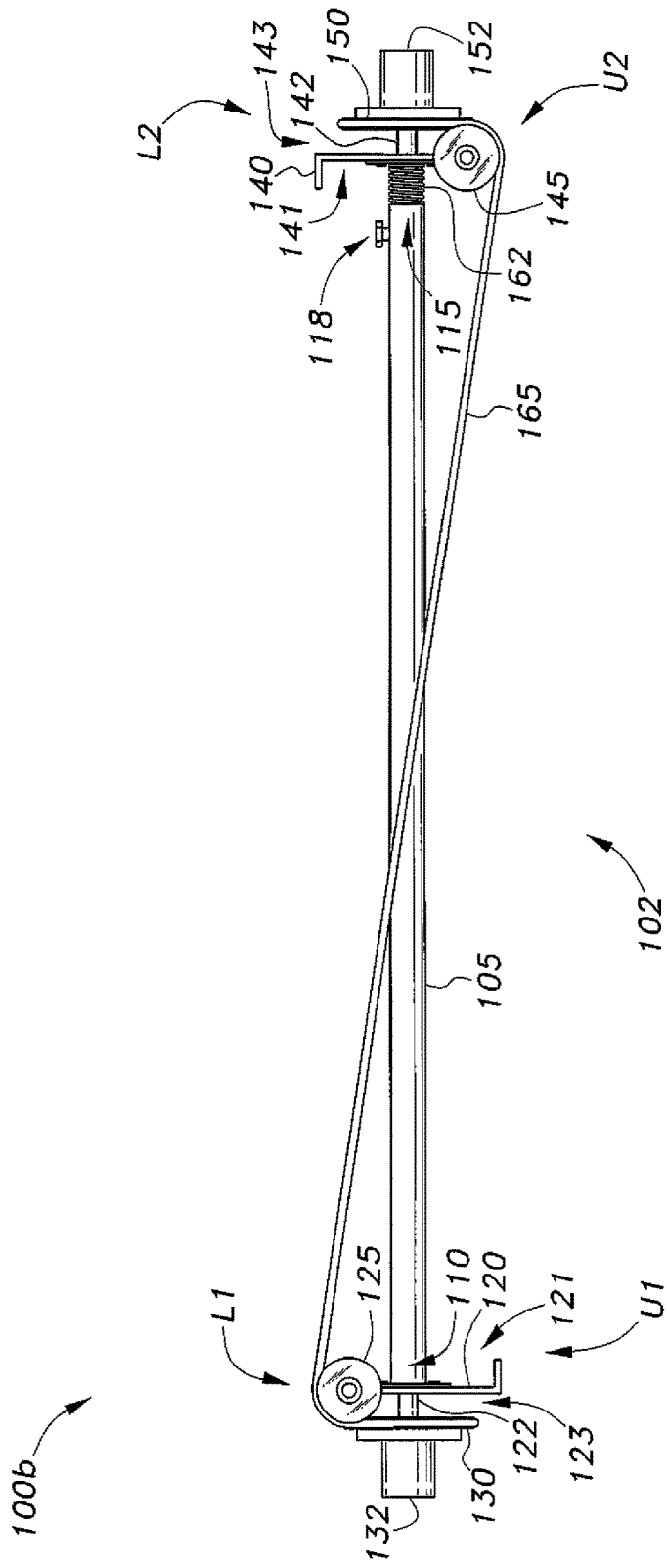
FIG. 1D is a side view of a second embodiment of a belt drive assembly according to the present invention.

Referring to FIG. 1D, a second embodiment of the belt assembly, generally designated 100b, is illustrated. The belt assembly 100b is substantially similar to belt assembly 100a, described herein. However, the idler pulleys 125 of the belt assembly 100b are rotatably mounted on the first end U1 of the first plate 120 and the idler pulleys 145 are rotatably mounted at the second end L2 of the second plate 140 so that the belt 165 slopes downward between the first plate 120 and the second plate 140. Also, the belt 165 is configured in an upright "U" under the drive pulley 130 and in an inverted "U" under the driven pulley 150. Thus, as viewed from the side, the belt 165 describes an "N" configuration, as shown in FIG. 1D.

The belt assemblies 100a, 100b can also include a first clamp member 132 to secure the drive pulley wheel 130 to the outer surface 123 of the first plate 120 and a second clamp member 152 to secure the driven pulley wheel 150 to the outer surface 143 of the second plate 140.

The shaft 105, which may be a hollow tubular rod, includes a first portion 110 and a second portion 115, the second portion 115 of the shaft 105 having an opening 116, the shaft 105 defining a lumen extending therethrough, wherein the first portion 110 of the shaft 105 is mounted on the attachment member 112 of the inner surface 121 of the first plate 120 and the second portion 115 of the shaft 105 is mounted on the attachment member 147 of the inner surface 141 of the second plate 140. The first portion 110 of the shaft 105 can include a reinforcement plate 114 configured for securing the first portion 110 of the shaft 105 to the inner surface 121 of the first plate 120. For example, the reinforcement plate 114 can include a plurality of openings 113, each opening 113 configured for receiving a fastener (not shown), such as a screw, to secure the first portion 110 of the shaft 105 to the inner surface 121 of the first plate 120. It is to be understood that the shaft 105 can be formed from any suitable material, such as metal, and can have any length suitable to enable the power source PS to communicate with the driven component DC.

The belt drive assemblies 100a, 100b include a fastener 118, such as a locking screw, configured for locking the second portion 115 of the shaft 105 to the attachment member 147 positioned on the inner surface 141 of the second plate 140. For example, once the desired length of the frame 102 has been determined, the second portion 115 of the shaft 105 may be locked into position by aligning the opening 116 on the second portion 115 of the shaft 105 with one of the plurality of openings 149 on the attachment member 147 positioned on the inner surface 141 of the second plate 140 and threading the fastener 118 through the opening 116 on the second portion 115 of the shaft 105 into the corresponding opening 149 on the attachment member 147. It is to be noted that the attachment member 147 can include a reinforcement plate 119 configured for securing the attachment member 147 to the inner surface 141 of the second plate 140.

The distance between the first plate 120 and the second plate 140 may be increased or decreased, respectively, by aligning the opening 116 on the second portion 115 of the shaft 105 with one of the plurality of openings 149 along the attachment member 147 positioned on the inner surface 141 of the second plate 140. For example, if a user desires to increase the distance between the first plate 120 and the second plate 140, the user can move the opening 116 on the second portion 115 of the shaft 105 outward, such as away from the inner surface 141 of the second plate 140, along the attachment member 147 positioned on the inner surface 141 of the second plate 140, until the desired length is reached. If, on the other hand, the user desires to decrease the distance between the first plate 120 and the second plate 140, the user can move the opening 116 on the second portion 115 of the shaft 105 inward, such as toward the inner surface 141 of the second plate 140 along the attachment member 147 positioned on the inner surface 141 of the second plate 140, until the desired length is reached. Once the desired length has been reached the second portion 115 of the shaft 105 can be locked in place, as described above.

The first plate 120 and the second plate 140 can have any suitable shape, such as a square shape, such as a generally square shape, and be formed from any suitable material, such as metal, that can support the drive pulley wheel 130 and the first clamp member 132, the driven pulley wheel 150 and the second clamp member 152, as well as the shaft 105 and each of the idler pulley wheels 125, 145. The first pair of coaxial idler pulley wheels 125 and the second pair of coaxial idler pulley wheels 145 can be any type of idler pulley wheels already known in the art. Further, each of the idler pulley wheels of the first pair of coaxial idler pulley wheels 125 includes a given diameter and each of the idler pulley wheels of the second pair of coaxial idler pulley wheels 145 includes a diameter equal to the given diameter.

The endless belt 165 can be form from any suitable material, such as polyurethane, that allows the endless belt 165 to maintain an elastic characteristic. It is to be noted that over time the elasticity of the endless belt 165 can degrade, which, in turn, can cause the tension of the endless belt 165 to decrease and cause the endless belt 165 to slip and detach from the drive pulley wheel 130, the driven pulley wheel 150, or from any of the idler pulley wheels 125, 145. Accordingly, the belt drive assemblies 100a, 100b can include a resilient member 162, such as a spring, positioned between the inner surface 141 of the second plate 140 and the second portion 115 of the shaft 105, the resilient member 162 configured for providing a sufficient amount of tension on the endless belt 165 so as to prevent, such as substantially prevent, the endless belt 165 from detaching from the drive pulley wheel 130, the driven pulley wheel 150, or any of the idler pulley wheels 125, 145.

By way of operation, once the first portion 110 of the shaft 105 is mounted onto the attachment member 112 positioned on the inner surface 121 of the first plate 120, the first portion 110 of the shaft 105 can be secured to the inner surface 121 of the first plate 120 by securing the reinforcement plate 114 to the inner surface 121 of the first plate 120. The second portion 115 of the shaft 105 can then be mounted onto the attachment member 147 positioned on the inner surface 141 of the second plate 140, such that the opening 116 on the second portion 115 of the shaft 105 aligns with one of the plurality of openings 149 on the attachment member 147.

Once the opening 116 on the second portion 115 of the shaft 105 is aligned with one of the plurality of openings 149 on the attachment member 147 positioned on the inner surface 141 of the second plate 140, such that the belt drive assembly 100a, 100b has the desired length, the fastener 118 can be inserted through the opening 116 on the second portion 115 and into the corresponding opening 149 on the attachment member 147 positioned on the inner surface 141 of the second plate 140 to lock the shaft 105 into place.

Subsequently, the first pair of coaxial idler pulley wheels 125 can be rotatably mounted at the second end L1 of the first plate 120 and the second pair of coaxial idler pulley wheels 145 can be rotatably mounted at the first end U2 of the second plate 140 so that the first pair of coaxial idler pulley wheels 125 and the second pair of coaxial idler pulley wheels 145 are diagonally positioned in relation to each another, such as in an inverted "N" configuration as illustrated in FIGS. 1A-1C. However, as mentioned above, the first pair of coaxial idler pulley wheels 125 can also be rotatably mounted at the first end U1 of the first plate 120 and the second pair of coaxial idler pulley wheels 145 can be rotatably mounted at the second end L2 of the second plate 140 so that the first pair of coaxial idler pulley wheels 125 and the second pair of coaxial idler pulley wheels 145 are diagonally positioned in relation to each another, such as in an "N" configuration, as illustrated in FIG. 1D.

The drive pulley wheel 130 and the driven pulley wheel 150 can then be rotatably coupled to the attachment member 122 positioned on the outer surface 123 of the first plate 120 and to the attachment member 142 positioned on the outer surface 143 of the second plate 140, respectively, by any suitable means known in the art. The first clamp member 132 can be positioned on the attachment member 122 to secure the drive pulley wheel 130 and the second clamp member 152 can be positioned on the attachment member 142 so as to secure the driven pulley wheel 150. The user can then attach the drive shaft D coupled to the power source PS to the first clamp member 132 and the driven shaft DS coupled to the driven component DC to the second clamp member 152.

Subsequently, the user can train the endless belt 165 on the drive pulley wheel 130, each of idler pulley wheels 125, 145, as well as on the driven pulley wheel 150 to engage the driven pulley wheel 150 when the drive shaft D coupled to the drive pulley wheel 130 is rotated in a given direction, such as in a clockwise direction, by the power source PS, such as an engine, an electric motor, a pneumatic motor, a hydraulic motor, and a wind turbine, and rotate the driven pulley wheel 150 to rotate the driven shaft DS and, in turn, the driven component DC, such as a rear axle of a front wheel drive vehicle, a pusher propeller of an airplane, a fan, a pump, and other rotary devices.

The resilient member 165 positioned between the second portion 115 of the shaft 105 and the inner surface 141 of the second plate 140 may be expanded or contracted until a suitable amount of tension on the endless belt 165 is achieved. For example, to increase the tension on the endless belt 165, the user can compress the resilient member 165, whereas to decrease the tension on the belt drive assembly 100a the user can expand the resilient member 165.

It is to be noted that in this configuration the drive pulley wheel 130 and the driven pulley wheel 150 of the belt drive assembly 100a may rotate in the same direction while each idler pulley wheel of the first pair of coaxial idler pulley wheels 125 may rotate in counter direction with respect to each other and each idler pulley wheel of the second pair of coaxial idler pulley wheels 145 may also rotate in counter direction with respect to each other.

Figure 2A:
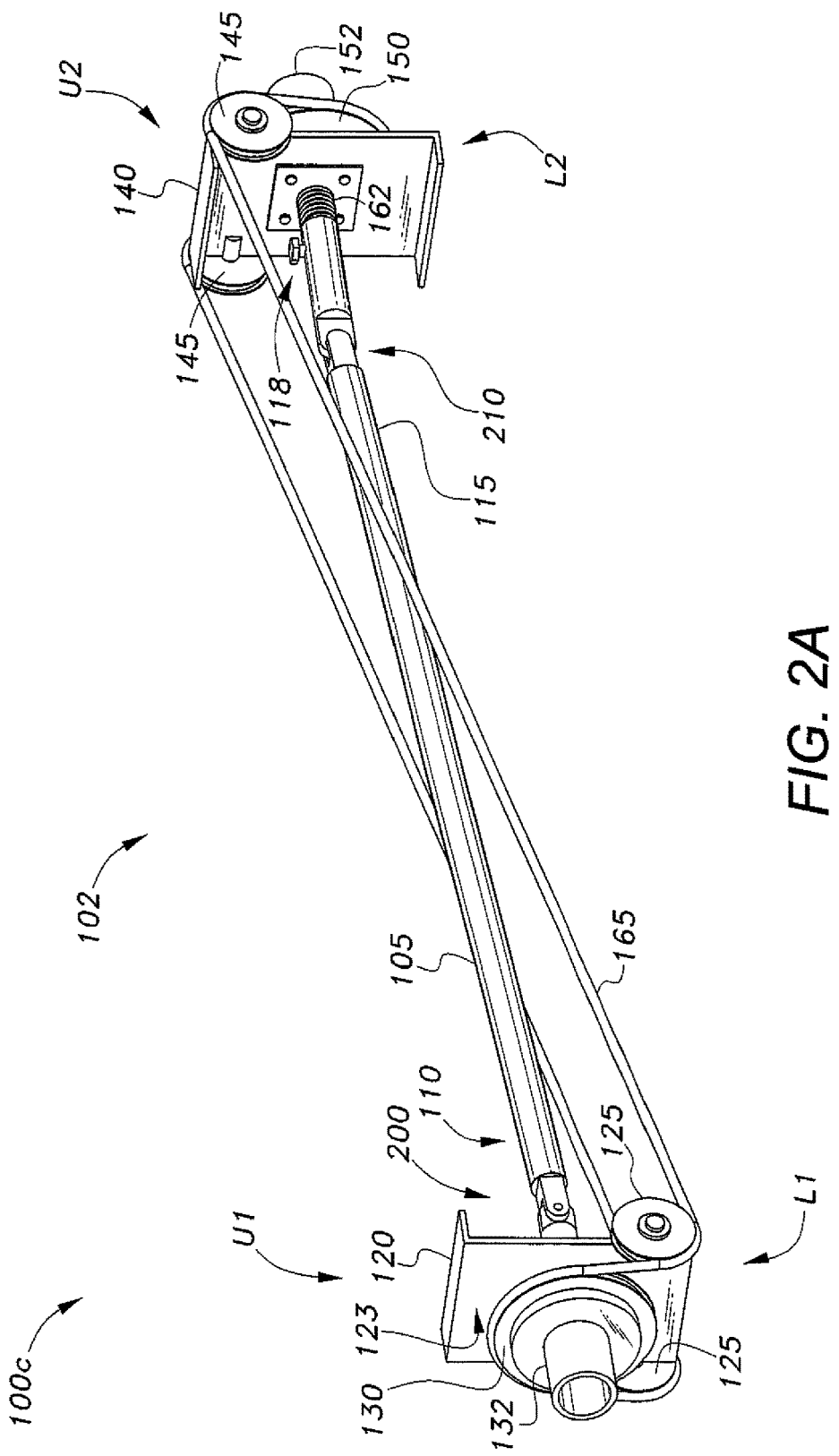
FIG. 2A is a perspective view of a third embodiment of a belt drive assembly according to the present invention.
Figure 2B:
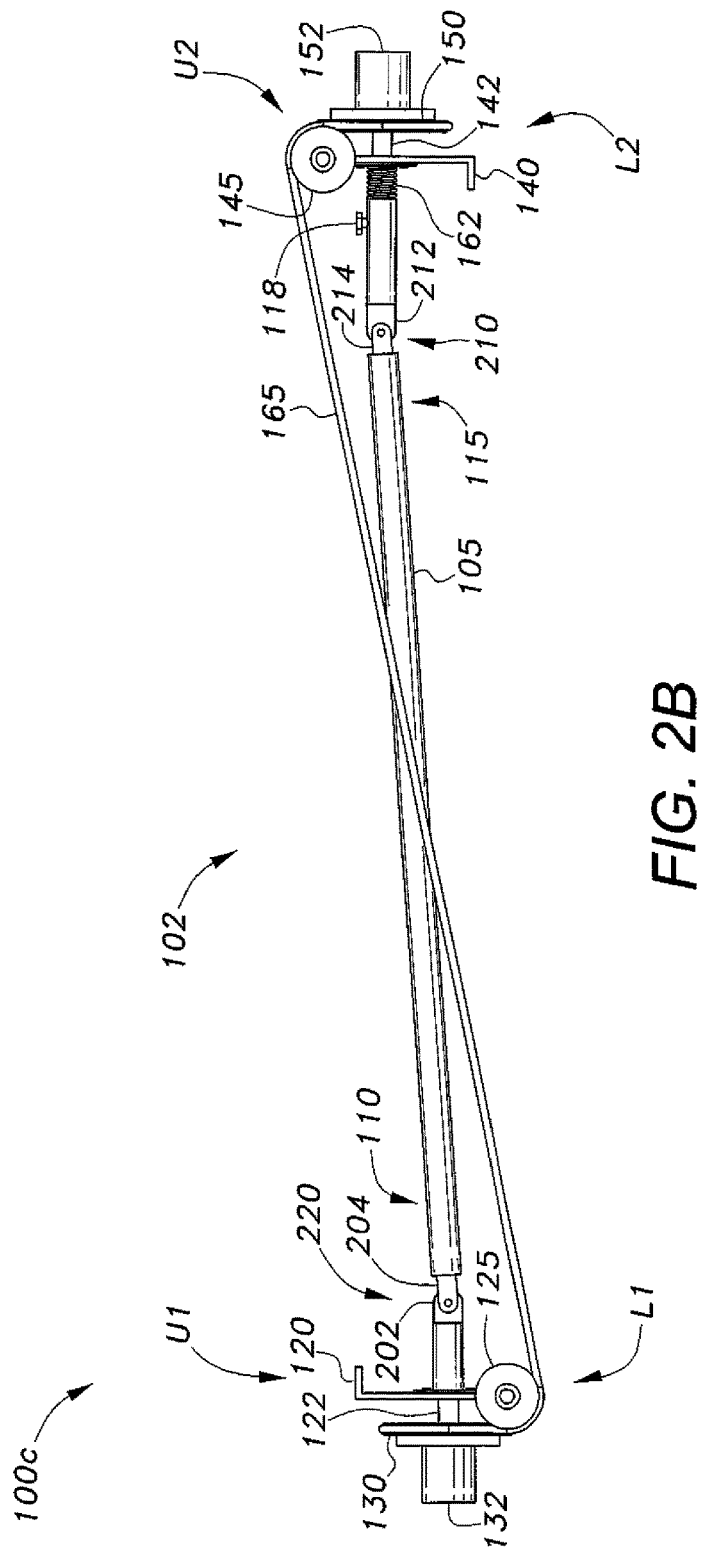
FIG. 2B is a side view of the belt drive assembly of FIG. 2A.

FIGS. 2A-2B depict a third embodiment of the belt drive assembly, generally designated as 100c. The belt drive assembly 100c is substantially similar to the first embodiment 100a and second embodiment 100b, described herein. The belt drive assembly 100c, however, includes a first pivot assembly 200 and a second pivot assembly 210, the pivot assemblies 200, 210 being configured for maintaining the torque and rotation between the drive shaft D (FIGS. 1A and 1B) and the driven shaft DS (FIGS. 1A and 1B), wherein the pivot assemblies can compensate for any misalignment between the drive shaft D and the driven shaft DS.

The first pivot assembly 200 includes a primary U-joint 202 fixedly coupled to the first plate 120 and a secondary U-joint 204 fixedly coupled to the first portion 110 of the shaft 105, the primary U-joint 202 of the first pivot assembly 200 being interconnected with the secondary U-joint 204 of the first pivot assembly 200 so that the shaft 105 can be moved in an upward direction and in a downward direction in relation to the drive pulley wheel 130. The second pivot assembly 210 includes a primary U-joint 212 fixedly coupled to the second plate 140 and a secondary U-joint 214 fixedly coupled to the second portion 115 of the shaft 105, the primary U-joint 212 of the second pivot assembly 210 being interconnected with the secondary U-joint 214 of the second pivot assembly 210 in a similar fashion as with the first pivot assembly 200, so that the shaft 105 can move in an upward direction and in a downward direction in relation to the driven pulley wheel 150. Once, the endless belt 165 is trained on the drive pulley wheel 130, each of the idler pulley wheels 125, 145, as well as on the driven pulley wheel 150, the belt drive assembly 100b operates in a similar fashion as the belt drive assembly 100a.

Figure 3A:
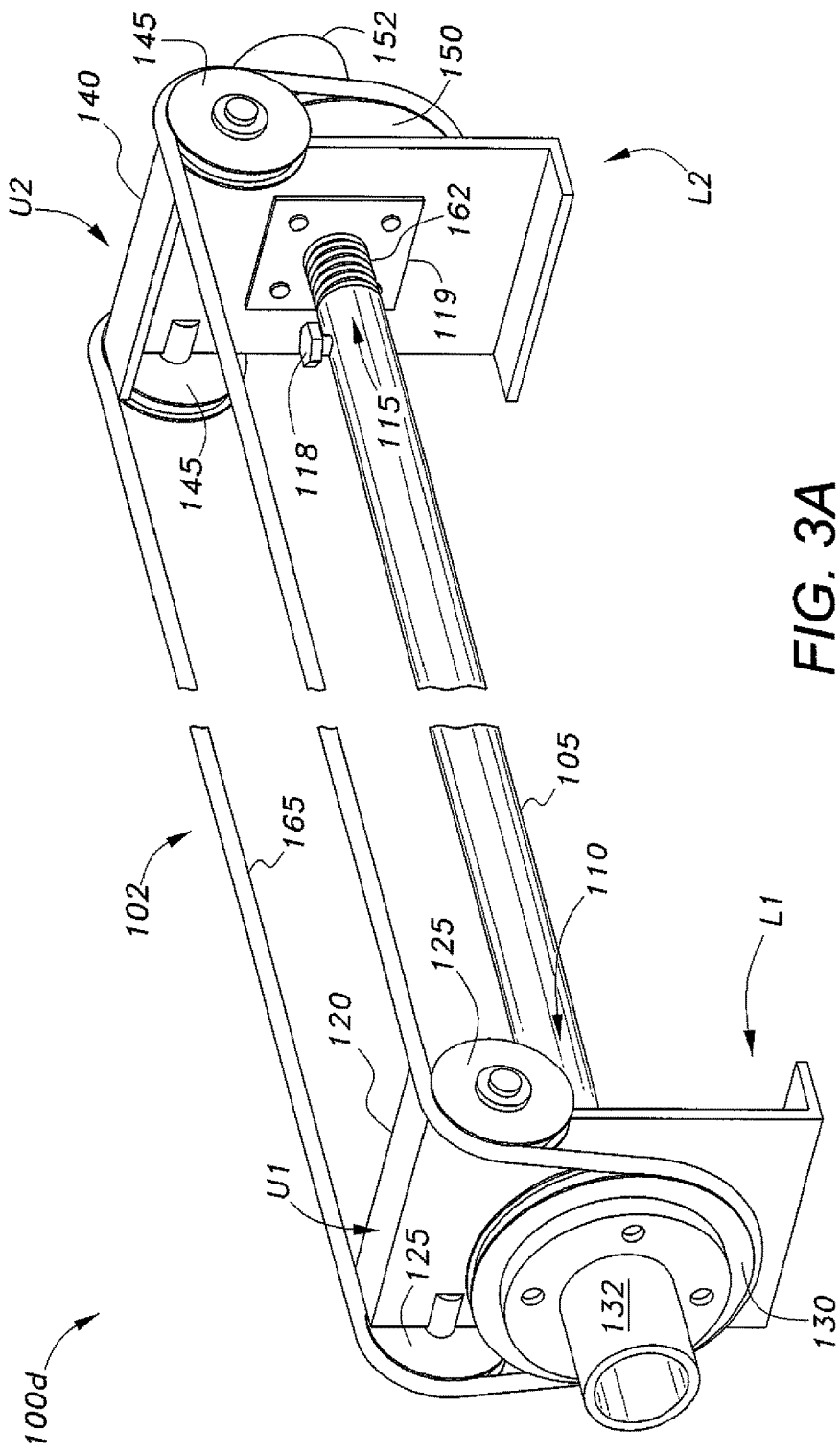
FIG. 3A is a perspective view of a fourth embodiment of a belt drive assembly according to the present invention.
Figure 3B:
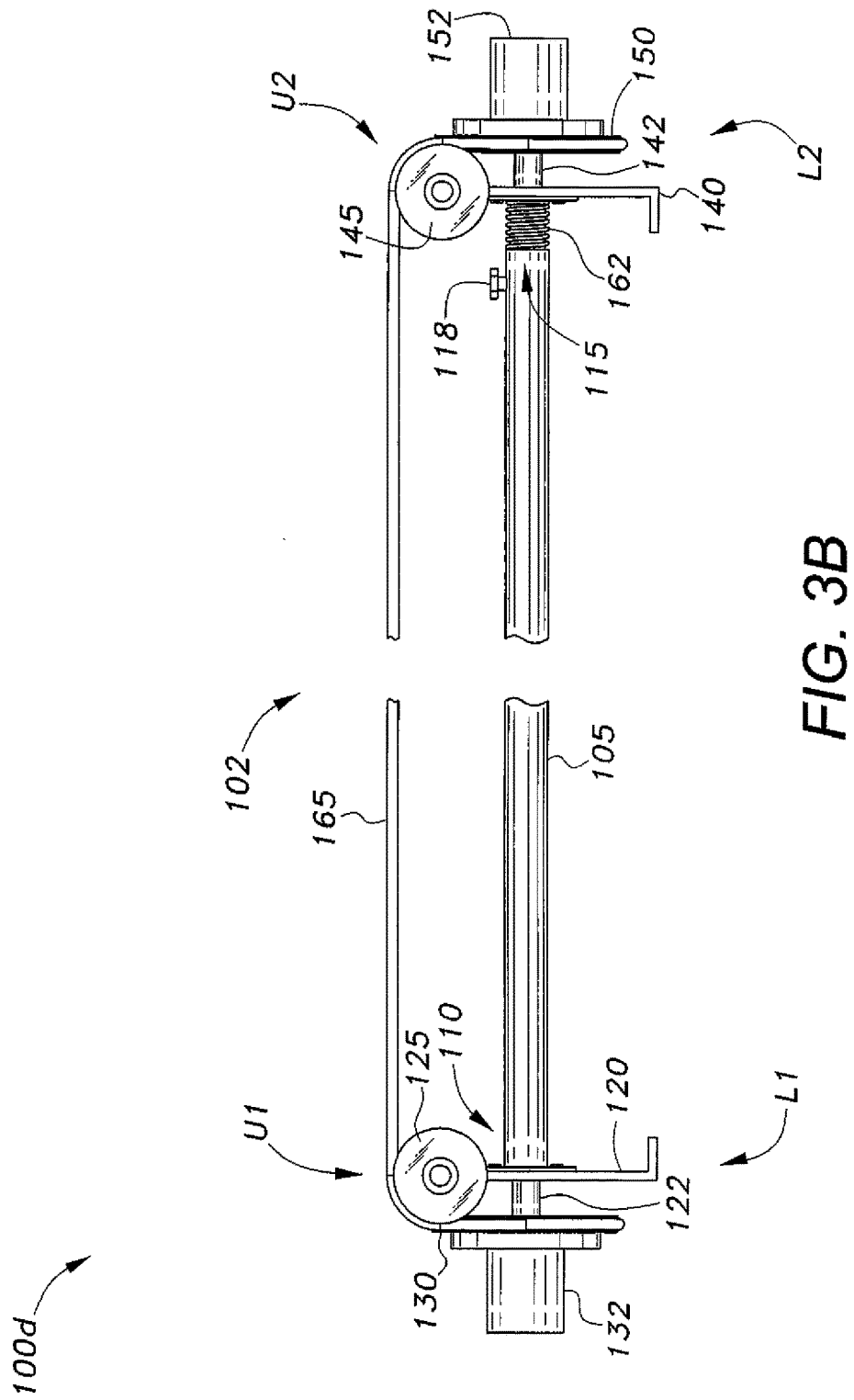
FIG. 3B is a side view of the belt drive assembly of FIG. 3A.

FIGS. 3A-3B depict a fourth embodiment of the belt drive assembly, generally designated as 100d. The belt drive assembly 100d is substantially similar to the first embodiment 100a, described herein. However, the first pair of coaxial idler pulley wheels 125 and the second pair of coaxial idler pulley wheels 145 of the belt drive assembly 100c are coplanar instead of diagonally positioned with respect to each other. For example, the first pair of coaxial idler pulley wheels 125 is rotatably mounted at the first end U1 of the first plate 120 and the second pair of coaxial idler pulley wheels 145 is rotatably mounted at the first end U2 of the second plate 140, as illustrated in FIGS. 3A-3B.

It is to be noted that the belt drive assembly 100d operates in a similar fashion as the belt drive assembly 100a. However, due to the coplanar position of the first pair of coaxial idler pulley wheels 125 and the second pair of coaxial idler pulley wheels 145, when the drive pulley wheel 130 is rotated in a given direction, e.g. clockwise, by the drive shaft D coupled to the power source PS, the driven pulley wheel 150 may be rotated in a direction opposite the given direction, e.g. counterclockwise. As shown in FIG. 3B, when viewed from the side, the belt 165 extends substantially horizontally between the idler pulleys 125, 145 at the first ends U1, U2 of the plates 120, 140 and loops under both the drive pulley 130 and the driven pulley 150, so that the belt describes an inverted "U" configuration.

Figure 3C:
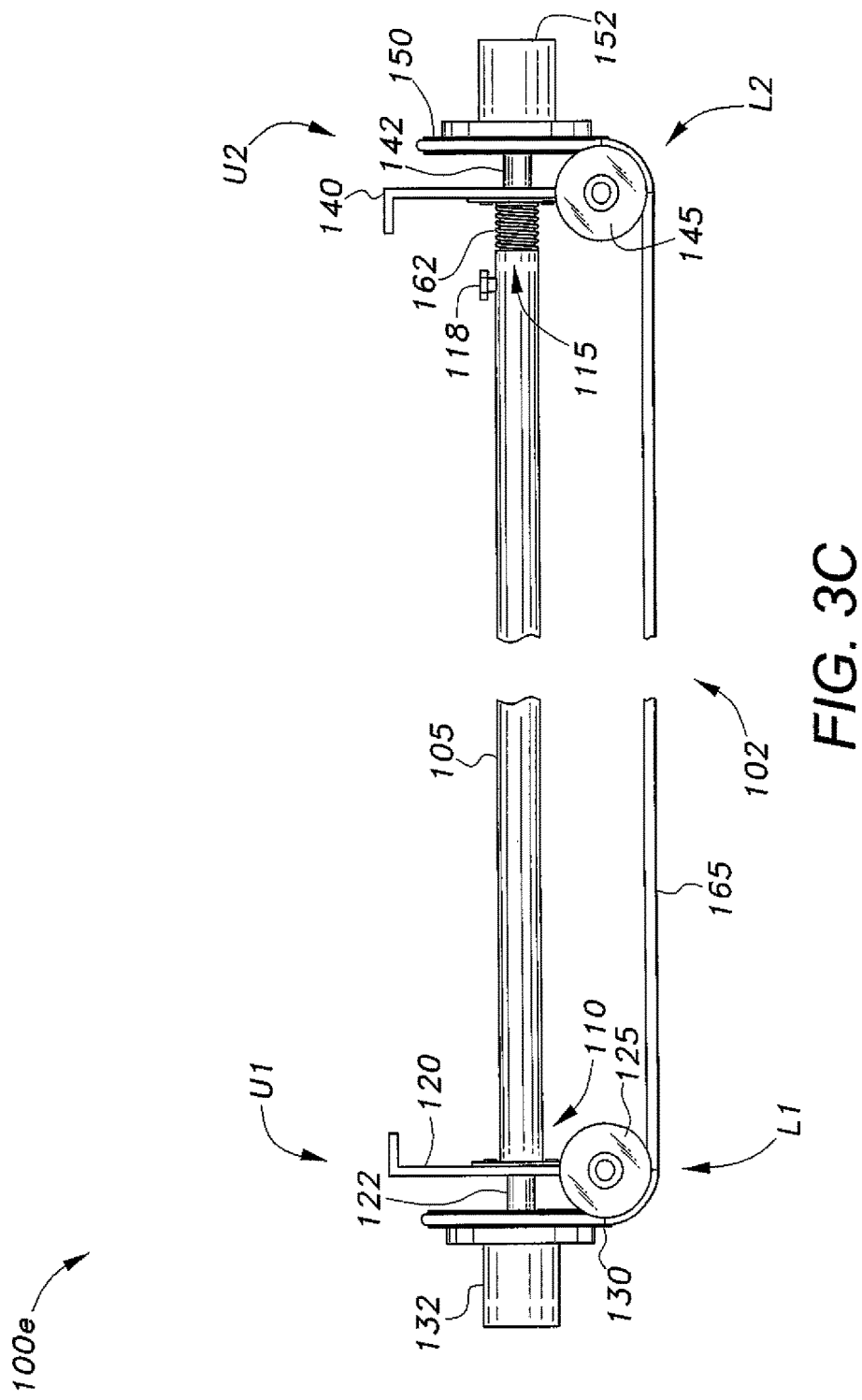
FIG. 3C is a perspective view of a fifth embodiment of a belt drive assembly according to the present invention.

FIG. 3C depicts a fifth embodiment, generally designated 100e. The belt drive assembly 100e is substantially similar to the first embodiment 100d, described herein. However, when viewed from the side, the belt 165 extends substantially horizontally between the idler pulleys 125, 145 at the second ends L1, L2 of the plates 120, 140 and loops over both the drive pulley 130 and the driven pulley 150, so that the belt describes a "U" configuration.

Figure 4A:
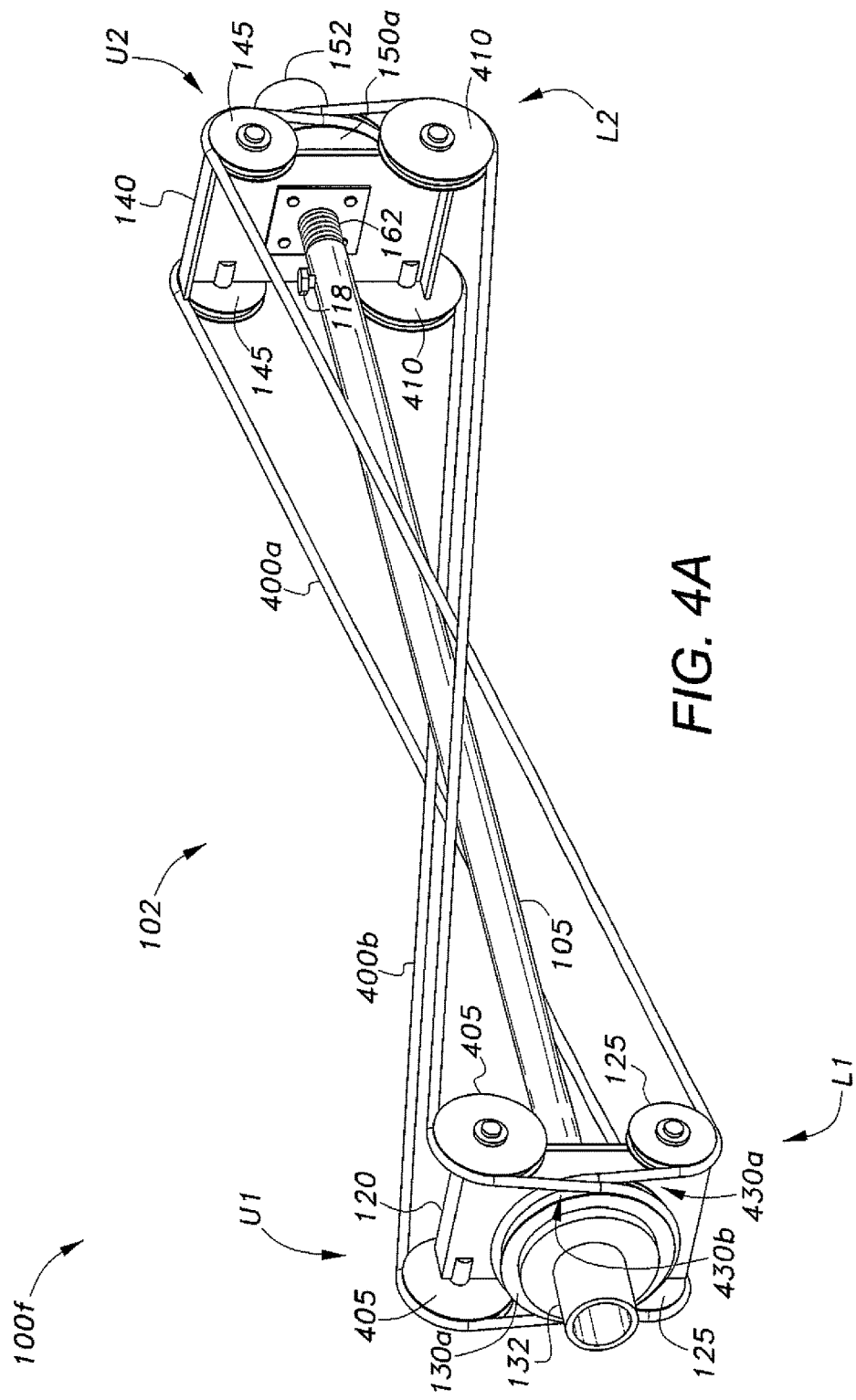
FIG. 4A is a perspective view of a sixth embodiment of a belt drive assembly according to the present invention.
Figure 4B:
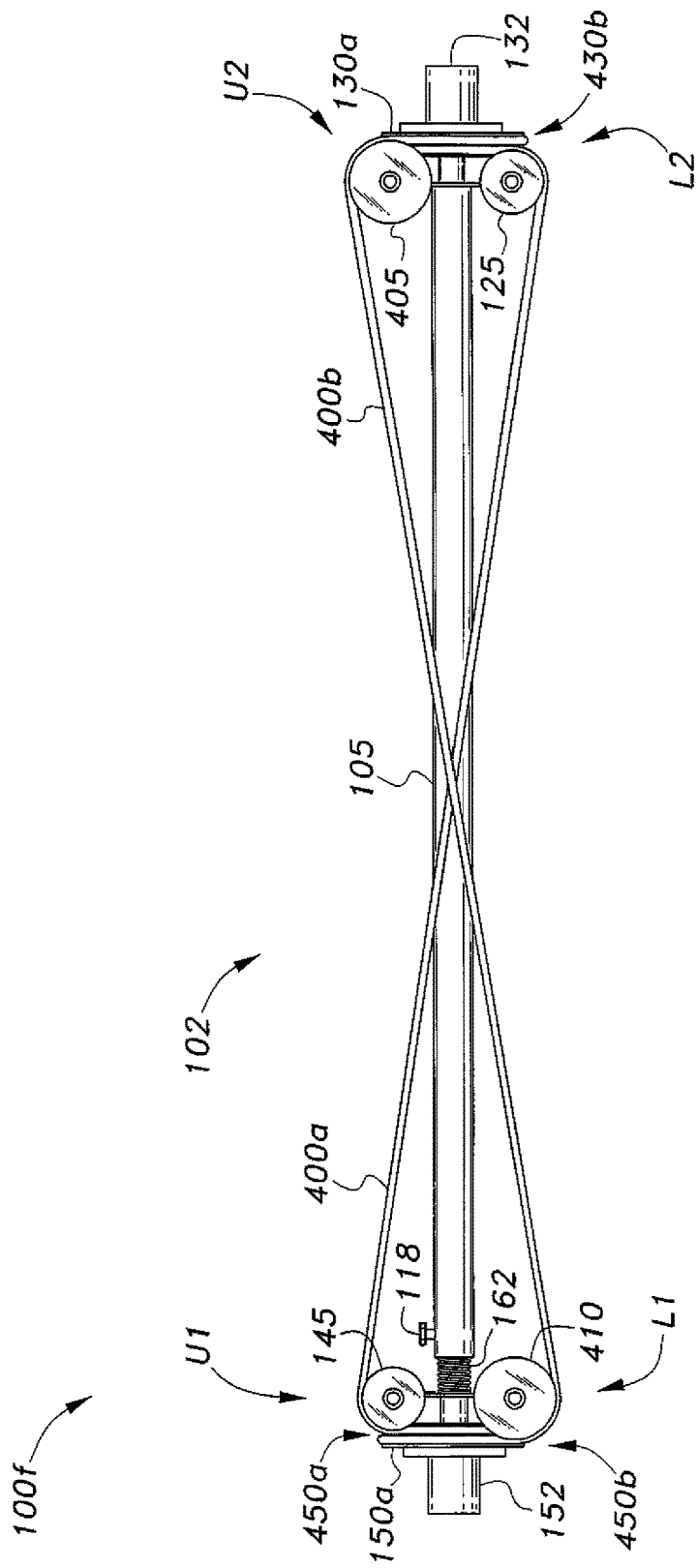
FIG. 4B is a side view of the belt drive assembly of FIG. 4A.

FIGS. 4A-4B depict a sixth embodiment of the belt drive assembly, generally designated as 100f. The belt drive assembly 100f is substantially similar to the first embodiment 100a, described herein. The belt drive assembly 100f, however, includes a third pair of coaxial idler pulley wheels 405 rotatably mounted at the first end U1 of the first plate 120 and a fourth pair of coaxial idler pulley wheels 410 rotatably mounted at the second end L2 of the second plate 140, so that both plates 120, 140 have coaxial pairs of idler pulleys at both the upper and lower ends of the plates 120, 140.

It is to be noted that the positioning of the first pair of coaxial idler pulley wheels 125 and the third pair of coaxial idler pulley wheels 405, as well as the positioning of the second pair of coaxial idler pulley wheels 145 and the fourth pair of coaxial idler pulley wheels 410 on the first plate 120 and the second plate 140, respectively, can be modified to increase the efficiency of the power transmission from the power source PS to the driven component DC. Further, each of the idler pulley wheels of the third pair of coaxial idler pulley wheels 405 and the fourth pair of coaxial idler pulley wheels 410, respectively, have a diameter greater than the given diameter of each of the idler pulley wheels of the first pair of coaxial idler pulley wheels 125 and the second pair of coaxial idler pulley wheels 145.

The belt drive assembly 100f also includes a drive pulley wheel 130a having a first groove 430a and a second groove 430b, the drive pulley wheel 130a being rotatably positioned on the first plate 120, and the driven pulley wheel 150a has a first groove 450a and a second groove 450b, the driven pulley wheel 150 being rotatably positioned on the second plate 140. The belt assembly 100f has a pair of endless belts, including a first endless belt 400a and a second endless belt 400b. The first endless belt 400a is trained on each of the idler pulley wheels of the first pair of coaxial idler pulley wheels 125, the first groove 430a of the drive pulley wheel 130a, each of the idler pulley wheels of the second pair of coaxial idler pulley wheels 145, and the first groove 450a of the driven pulley wheel 140a. The second endless belt 400b is trained on the second groove 430b of the drive pulley wheel 130a, each of the idler pulley wheels of the third pair of coaxial idler pulley wheels 405, each of the idler pulley wheels of the fourth pair of coaxial idler pulley wheels 410, as well as the second groove 450b of the driven pulley wheel 140a. Thus, the first endless belt 400a and the second endless belt 400b are diagonally related to one another, defining a closed-ended, over lapping "X" configuration between the plates 120, 140 in the side view of FIG. 4B. It is to be noted that the belt drive assembly 100f operates in a similar fashion as the belt drive assembly 100a.

Figure 5A:
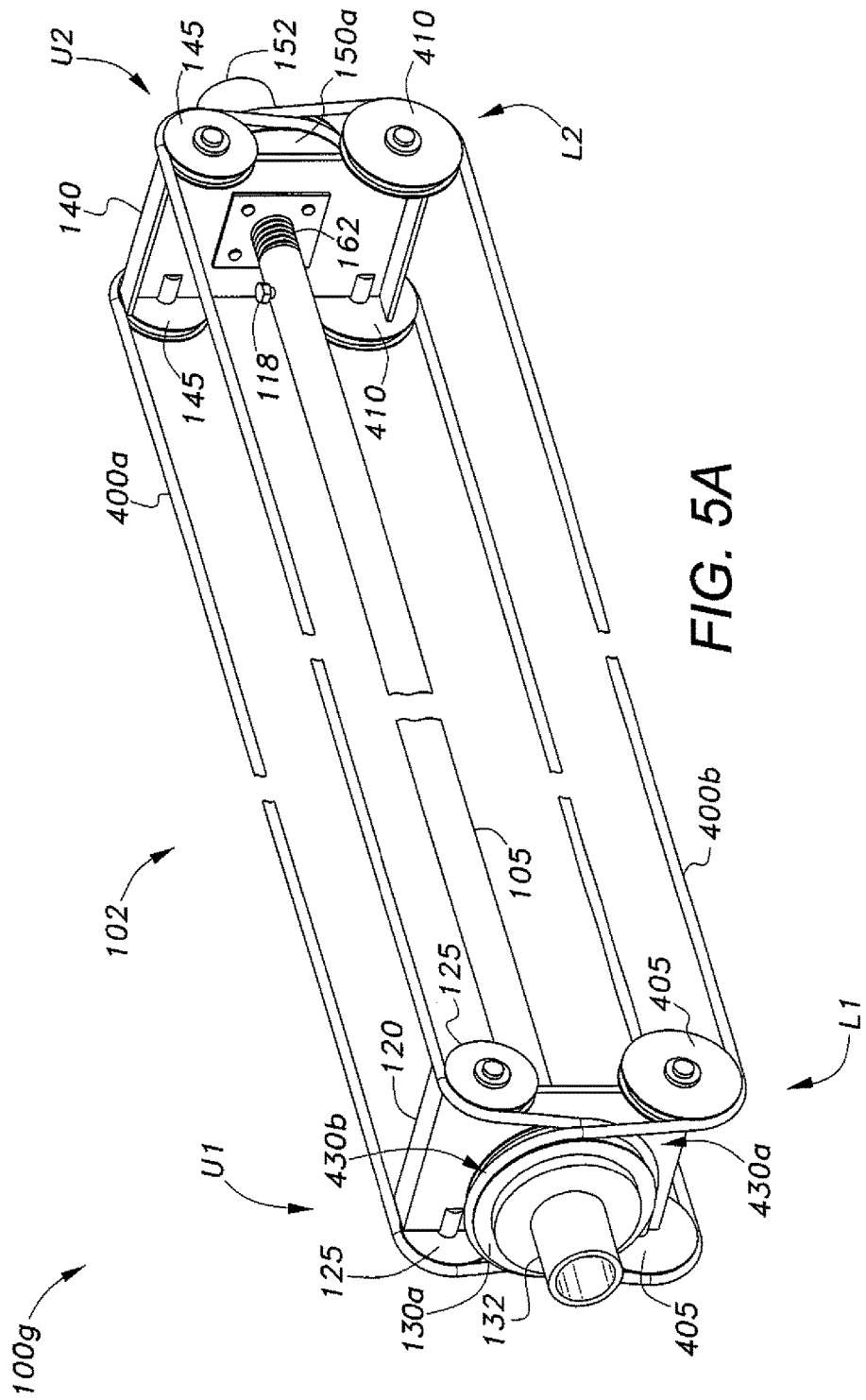
FIG. 5A is a perspective view of a seventh embodiment of a belt drive assembly according to the present invention.

FIGS. 5A-5B depict a seventh embodiment of the belt drive assembly, generally designated as 100g. The belt drive assembly 100g is substantially similar to the belt drive assembly 100f, described herein. The first pair of coaxial idler pulley wheels 125 and the second pair of coaxial idler pulley wheels 145 are coplanar with respect to one another, and the third pair of coaxial idler wheels 405 and the fourth pair of coaxial idler pulley wheels 410 are coplanar with respect to one another. For example, the first pair of coaxial idler pulley wheels 125 and the second pair of coaxial idler pulley wheels 145 can each be rotatably mounted at the first end U1, U2 of the first plate 120 and the second plate 140, respectively, and the third pair of coaxial idler pulley wheels 405 and the fourth pair of coaxial idler pulley wheels 410 can be rotatably mounted at the second end L1, L2 of the first plate 120 and the second plate 140, respectively.

The first endless belt 400a is trained on each of the idler pulley wheels of the first pair of coaxial idler pulley wheels 125, the first groove 430a of the drive pulley wheel 130a, each of the idler pulley wheels of the second pair of coaxial idler pulley wheels 145, and the first groove 450a of the driven pulley wheel 150a. The second endless belt 400b is trained on the second groove 430a of the drive pulley wheel 130a, each of the idler pulley wheels of the third pair of coaxial idler pulley wheels 405, each of the idler pulley wheels of the fourth pair of coaxial idler pulley wheels 410, and the second groove 450b of the driven pulley wheel 150a, such that the first endless belt 400a and the second endless belt 400b are parallel to one another and define a configuration that is generally rectangular and includes four rounded corners when viewed from the side, as illustrated in FIGS. 5A-5B.

The belt drive assembly 100g operates in a similar fashion as the belt drive assembly 100f. However, this type of configuration can allow the drive pulley wheel 130a and the driven pulley wheel 150a to rotate in opposite directions. Regardless, a plurality of endless belts, as in the belt drive assemblies 100f, 100g, can increase traction and provide a larger torque transmission, as well as increase operational safety. For example, when one endless belt fails the power transmission can continue through the other endless belt until the broken endless belt can be replaced.

It is to be understood that the present invention is not limited to the embodiments described above, but encompasses any and all embodiments within the scope of the following claims.

I claim:

1. A belt drive assembly, comprising:
   a frame having:
      a first plate including an inner surface, an outer surface, a first end, and a second end;
      a second plate including an inner surface, an outer surface, a first end, and a second end, the inner surface of the second plate having an attachment member including a plurality of openings; and
      an intermediate frame portion extending between and connecting the inner surface of the first plate and the inner surface of the second plate;
   a first pair of idler pulley wheels positioned coaxially at one of the ends of the first plate;
   a second pair of idler pulley wheels positioned coaxially at one of the ends of the second plate;
   a drive pulley wheel rotatably mounted onto the outer surface of the first plate, the drive pulley wheel being adapted for rotation by a drive shaft coupled to a power source;
   a driven pulley wheel rotatably mounted onto the outer surface of the second plate, the driven pulley wheel being adapted for rotating a driven shaft coupled to a driven component; and
   at least one endless belt trained on the drive pulley wheel, on at least two of the idler pulley wheels, and on the driven pulley wheel.

2. The belt drive assembly according to claim 1, wherein the intermediate frame portion comprises at least one shaft, the at least one shaft including a first portion and a second portion, the second portion having an opening, the at least one shaft defining a lumen extending therethrough.

3. The belt drive assembly according to claim 2, further comprising a fastener selectively locking the second portion of the at least one shaft to the attachment member positioned on the inner surface of the second plate.

4. The belt drive assembly according to claim 1, further comprising a resilient member disposed between said first plate and said second plate for selectively tensioning the endless belt.

5. The belt drive assembly according to claim 1, further comprising at least one clamp member.

6. The belt drive mechanism according to claim 1, further comprising at least one pivot assembly disposed on the intermediate frame portion.

7. The belt drive assembly according to claim 1, wherein the first pair of coaxial idler pulley wheels is rotatably mounted at the second end of said first plate, the first pair of coaxial idler pulley wheels being non-coaxial with an axis of rotation of the drive pulley, and the second pair of coaxial idler pulley wheels is rotatably mounted at the first end of said second plate so that the idler pulleys are diagonally opposite each other, the second pair of coaxial idler pulley wheels being non-coaxial with an axis of rotation of the driven pulley, the at least one endless belt consisting of a single endless belt trained over the drive pulley wheel, under the first pair of coaxial idler pulley wheels, over the second pair of coaxial idler pulley wheels and under the driven pulley wheel, so that the endless belt defines an inverted "N" configuration or an "N" configuration when viewed laterally, the drive pulley wheel and the driven pulley wheel rotating in the same direction.

8. The belt drive assembly according to claim 7, wherein the drive pulley wheel comprises a drive pulley wheel having a first groove and a second groove and the driven pulley wheel comprises a driven pulley wheel having a first groove and a second groove.

9. The belt drive assembly according to claim 8, further comprising;
a third pair of coaxial idler pulley wheels rotatably mounted at the first end of the first plate opposite the first pair of coaxial idler pulley wheels, third pair of coaxial idler pulley wheels being non-coaxial with an axis of rotation of the drive pulley;
a fourth pair of coaxial idler pulley wheels rotatably mounted at the second end of the second plate opposite the second pair of coaxial idler pulley wheels, so that the third pair of coaxial idler pulley wheels and the fourth pair of coaxial idler pulley wheels are diagonally opposite to each other, the fourth pair of coaxial idler pulley wheels being non-coaxial with an axis of rotation of the driven pulley.

10. The belt drive assembly according to claim 9, wherein the at least one endless belt comprises:
a first endless belt trained on the first groove of the drive pulley wheel, each of the idler pulley wheels of the first pair of coaxial idler pulley wheels, each of the idler pulley wheels of the second pair of coaxial idler pulley wheels, and the first groove of the driven pulley wheel; and
a second endless belt trained on the second groove of the drive pulley wheel, each of the idler pulley wheels of the third pair of coaxial idler pulley wheels, each of the idler pulley wheels of the fourth pair of coaxial idler pulley wheels, and the second groove of the driven pulley wheel so that the first endless belt and the second endless belt are positioned diagonally with respect to each other, defining a closed-ended "X" configuration when viewed laterally, the drive pulley wheel and the driven pulley wheel rotating in the same direction.

11. The belt drive assembly according to claim 1, wherein the first pair of coaxial idler pulley wheels is rotatably mounted at the first end of said first plate, the first pair of coaxial idler pulley wheels being non-coaxial with an axis of rotation of the drive pulley, and the second pair of coaxial idler pulley wheels is rotatably mounted at the first end of said second plate, the second pair of coaxial idler pulley wheels being non-coaxial with an axis of rotation of the driven pulley.

12. The belt drive assembly according to claim 11, wherein said at least one endless belt consists of a single endless belt, the endless belt being trained under said drive pulley wheel, under said driven pulley wheel, and over said first and second pairs of coaxial idler pulley wheels, the endless belt defining an inverted "U" configuration or a "U" configuration when viewed laterally, the drive pulley wheel and the driven pulley wheel rotating in opposite directions.

13. The belt drive assembly according to claim 11, wherein the drive pulley wheel comprises a drive pulley wheel having a first groove and a second groove and the driven pulley wheel comprises a driven pulley wheel having a first groove and a second groove, the assembly further comprising;
a third pair of coaxial idler pulley wheels mounted at the second end of the first plate; and
a fourth pair of coaxial idler pulley wheels mounted at the second end of the second plate, said at least one endless belt including:
a first endless belt trained on the first groove of the drive wheel, each of the idler pulley wheels of the first pair of coaxial idler pulley wheels, each of the idler pulley wheels of the second pair of coaxial idler pulley wheels, and on the first groove of the driven pulley wheel; and
a second endless belt trained on the second groove of the drive pulley wheel, each of the coaxial idler pulley wheels of the third pair of idler pulley wheels, each of the idler pulley wheels of the fourth pair of coaxial idler pulley wheels, and the second groove of the driven pulley wheel, the first and second belts defining a rectangular configuration when viewed laterally, the drive pulley wheel and the driven pulley wheel rotating in opposite directions.

14. A belt drive assembly, comprising:
a frame having:
a first plate including an inner surface, an outer surface, a first end, and a second end;
a second plate including an inner surface, an outer surface, a first end, and a second end;
an adjustable length coupler connected between the inner surfaces of the first and second plates and spacing apart the first and second plates; and
means for adjusting the length of the coupler;
a first pair of coaxial idler pulleys rotatably mounted at one end of the first plate;
a second pair of coaxial idler pulleys rotatably mounted at one end of the second plate;
a drive pulley rotatably mounted on the outer surface of the first plate, the drive pulley wheel being adapted for rotation by a drive shaft;
a driven pulley rotatably mounted on the outer surface of the second plate, the driven pulley being adapted for rotating a driven shaft; and
at least one endless belt trained on the drive pulley wheel, at least two of the idler pulleys, and the driven pulley.

15. The belt drive assembly according to claim 14, wherein the first pair of coaxial idler pulleys is rotatably mounted at the second end of said first plate and the second pair of coaxial idler pulleys is rotatably mounted at the first end of said second plate so that the idler pulleys are diagonally opposite each other, the at least one endless belt consisting of a single endless belt trained over the drive pulley, under the first pair of coaxial idler pulleys, over the second pair of coaxial idler pulleys and under the driven pulley, so that the endless belt defines an inverted "N" configuration or an "N" configuration when viewed laterally, the drive pulley and the driven pulley rotating in the same direction.

16. The belt drive assembly according to claim 15, wherein said drive pulley and said driven pulley each comprise a double groove pulley defining first and second grooves, the assembly further comprising:
a third pair of coaxial idler pulleys rotatably mounted at the first end of the first plate opposite the first pair of coaxial idler pulleys; and
a fourth pair of coaxial idler pulleys rotatably mounted at the second end of the second plate opposite the second pair of coaxial idler pulleys, so that the third pair of coaxial idler pulleys and the fourth pair of coaxial idler pulleys are diagonally opposite to each other, said at least one endless belt comprising:
- a first endless belt trained on the first groove of the drive pulley, each of the first pair of coaxial idler pulleys, each of the second pair of coaxial idler pulleys, and the first groove of the driven pulley wheel; and
- a second endless belt trained on the second groove of the drive pulley, each of the third pair of coaxial idler pulleys, each of the fourth pair of coaxial idler pulleys, and the second groove of the driven pulley so that the first endless belt and the second endless belt define a closed-ended "X" configuration when viewed laterally, the drive pulley and the driven pulley rotating in the same direction.

17. The belt drive assembly according to claim 14, wherein the first pair of coaxial idler pulleys is rotatably mounted at the first end of said first plate and the second pair of coaxial idler pulleys is rotatably mounted at the first end of said second plate.

18. The belt drive assembly according to claim 17, wherein said at least one endless belt consists of a single endless belt, the endless belt being trained under said drive pulley, under said driven pulley, and over said first and second pairs of coaxial idler pulleys, the endless belt defining an inverted "U" configuration when viewed laterally, the drive pulley and the driven pulley rotating in opposite directions.

19. The belt drive assembly according to claim 18, said drive pulley and said driven pulley each comprise a double groove pulley defining first and second grooves, the assembly further comprising:
- a third pair of coaxial idler pulleys rotatably mounted at the second end of the first plate; and
- a fourth pair of coaxial idler pulleys rotatably mounted at the second end of the second plate, said at least one endless belt including:
  - a first endless belt trained on the first groove of the drive pulley, each of the first pair of coaxial idler pulleys, each of the second pair of coaxial idler pulleys, and on the first groove of the driven pulley wheel; and
  - a second endless belt trained on the second groove of the drive pulley, each of the third pair of coaxial idler pulleys, each of the fourth pair of coaxial idler pulleys, and the second groove of the driven pulley, the first and second belts defining a rectangular configuration when viewed laterally, the drive pulley and the driven pulley rotating in opposite directions.

20. The belt drive assembly according to claim 14, wherein said drive pulley and said driven pulley are substantially coaxial with an axis extending through the pulley axles or said drive pulley and said driven pulley are non-coaxial with an axis extending through the pulley axles.

* * * * *